(12) United States Patent
Agranovsky et al.

(10) Patent No.: US 8,542,805 B2
(45) Date of Patent: Sep. 24, 2013

(54) SYSTEM AND METHOD FOR ENCRYPTED MEDIA SERVICE IN AN INTERACTIVE VOICE RESPONSE SERVICE

(75) Inventors: Alexander S. Agranovsky, Longwood, FL (US); R J Auburn, Orlando, FL (US)

(73) Assignee: Voxeo Corporation, Orlando, FL (US)

(*) Notice: Subject to any disclaimer, the term of this patent is extended or adjusted under 35 U.S.C. 154(b) by 608 days.

(21) Appl. No.: 12/780,536

(22) Filed: May 14, 2010

(65) Prior Publication Data
US 2010/0290600 A1   Nov. 18, 2010

Related U.S. Application Data

(60) Provisional application No. 61/178,400, filed on May 14, 2009.

(51) Int. Cl.
*H04M 11/00* (2006.01)

(52) U.S. Cl.
USPC ............... 379/88.18; 379/88.1; 379/93.08

(58) Field of Classification Search
USPC ............... 379/88.18, 88.02, 265.09; 705/39
See application file for complete search history.

(56) References Cited

U.S. PATENT DOCUMENTS

| 6,922,411 B1 | 7/2005 | Taylor | |
|---|---|---|---|
| 2006/0064372 A1* | 3/2006 | Gupta | 705/39 |
| 2008/0317220 A1* | 12/2008 | Perkins et al. | 379/88.02 |
| 2009/0185673 A1* | 7/2009 | Erhart et al. | 379/265.09 |

* cited by examiner

*Primary Examiner* — Mohammad Islam
*Assistant Examiner* — Van D Huynh
(74) *Attorney, Agent, or Firm* — Davis Wright Tremaine LLP

(57) ABSTRACT

A third-party interactive voice response service includes a media archiving service in which media streams from a call to a subscriber is encrypted by a public key of the subscriber. The media streams may optionally be compressed and are encrypted in real-time so that at any time no tangible portion of the media streams can be accessed by the third party provider. The multiple media streams can optionally be compressed and/or encrypted individually or after they have been combined into a combined stream. The subscriber is able to retrieve the encrypted media streams and decrypt them using the subscriber's private key. The encryption and compression are under program control of the interactive voice response service.

24 Claims, 9 Drawing Sheets

| Dialed No. (DN) | Subscriber $i$ | Public Key (Pk$i$) |

SYSTEM AND METHOD FOR ENCRYPTED MEDIA SERVICE IN AN INTERACTIVE VOICE RESPONSE SERVICE

FIELD OF THE INVENTION

The present invention relates to telecommunication, and more particularly to a networked computer telephony system with encrypted media service.

BACKGROUND OF THE INVENTION

Two major telecommunication networks have evolved worldwide. The first is a network of telephone systems in the form of the Public Switched Telephone System (PSTN). This network was initially designed to carry voice communication, but later also adapted to transport data. The second is a network of computer systems in the form of the Internet. The Internet has been designed to carry data but also increasingly being used to transport voice and multimedia information. Computers implementing telephony applications have been integrated into both of these telecommunication networks to provide enhanced communication services. For example on the PSTN, computer telephony integration has provided more functions and control to the POTS (Plain Old Telephone Services). On the Internet, computers are themselves terminal equipment for voice communication as well as serving as intelligent routers and controllers for a host of terminal equipment.

The Internet is a worldwide network of IP networks communicating under TCP/IP. Specifically, voice and other multimedia information are transported on the Internet under the VoIP (Voice-over-IP) protocol, and under the H.323 standard that has been put forward for interoperability. Another important implementation of VOIP protocol is SIP ("Session Initiation Protocol".)

The integration of the PSTN and the IP networks allows for greater facility in automation of voice applications by leveraging the inherent routing flexibility and computing accessibility in the IP networks.

Interactive Voice Response ("IVR") is a technology that automates interaction with telephone callers. Enterprises are increasingly turning to IVR to reduce the cost of common sales, service, collections, inquiry and support calls to and from their company.

Historically, IVR solutions have used pre-recorded voice prompts and menus to present information and options to callers, and touch-tone telephone keypad entry to gather responses. Modern IVR solutions also enable input and responses to be gathered via spoken words with voice recognition.

IVR solutions enable users to retrieve information including bank balances, flight schedules, product details, order status, movie show times, and more from any telephone. Additionally, IVR solutions are increasingly used to place outbound calls to deliver or gather information for appointments, past due bills, and other time critical events and activities.

One issue that arises from an IVR is that a record needs to be made for certain type of transactions and kept as an archive. For example, an insurance company may deploy an IVR to facilitate its policy holders to conduct via phone transactions processes such as renewing, updating or canceling of insurance policies. As a form of protection and to meet regulatory requirements, records of such transactions will need to be made and maintained as archives so that they are available for audit and verification should the need arise.

Another example for the need to keep archives of phone transactions is in an IVR for health care services that allows patients to interact with the doctors via the IVR by phone. The resulting IVR transactions including phone conversations will form part of the records and archives maintained by the health care service provider.

When the IVRs are maintained and serviced from a premise of the insurance company or the health care provider, authorized access to the recordings and archives are more easily controlled and confidentiality maintained. However, the IVRs are often deployed on a hosted facility maintained by a third-party hosted facility provider. As a subscriber to the hosted IVR service, the subscriber such as the insurance company also has the need to keep the recordings and archives confidential from the hosting third party.

The usual solution for keeping online transactions confidential is to conduct the transactions using a secure transport layer (SSL) in a HTTPS protocol. The recording can be confidentially made at one of the endpoints. However, this solution only provides secure transport between the endpoints. Since the recordings are to be made at the IVR maintained at a third-party hosted facility, they can not be kept confidential from the third-party hosted facility provider.

Thus, there is a need to provide secure recording of transaction and phone conversations during an IVR call, especially when the IVR is being provided from a hosted facility.

SUMMARY OF THE INVENTION

A third-party interactive voice response service includes a media archiving service in which media streams from a call to a subscriber is encrypted by a public key of the subscriber. The media streams may optionally be compressed and are encrypted in real-time so that at any time no tangible portion of the media streams can be accessed by the third party provider. The multiple media streams can optionally be compressed and/or encrypted individually or after they have been combined into a combined stream. The subscriber is able to retrieve the encrypted media streams and decrypt them using the subscriber's private key. The encryption and compression are under program control of the interactive voice response service.

In a preferred embodiment, the public key information is contained in an entry in a subscriber directory. The voice response service as driven by a telephony script has access to the public key either by hard coding directly in the script or by looking up with the call number or dialed number DN in the subscriber directory for the associated public key. In this way, a given DN points to a subscriber which has an associated public key.

In a preferred embodiment, the encrypting is implemented by a filter object accessible through a set of software interfaces. The encrypting is performed in response to a set of encryption parameters such as a public key of the subscriber.

In another preferred embodiment, the compressing of the media streams is implemented by another filter object accessible through another set of software interfaces. The compression is performed in response to a set of compression parameters such as lossless or lossy compression.

DESCRIPTION OF THE PREFERRED EMBODIMENTS

Figure 1:
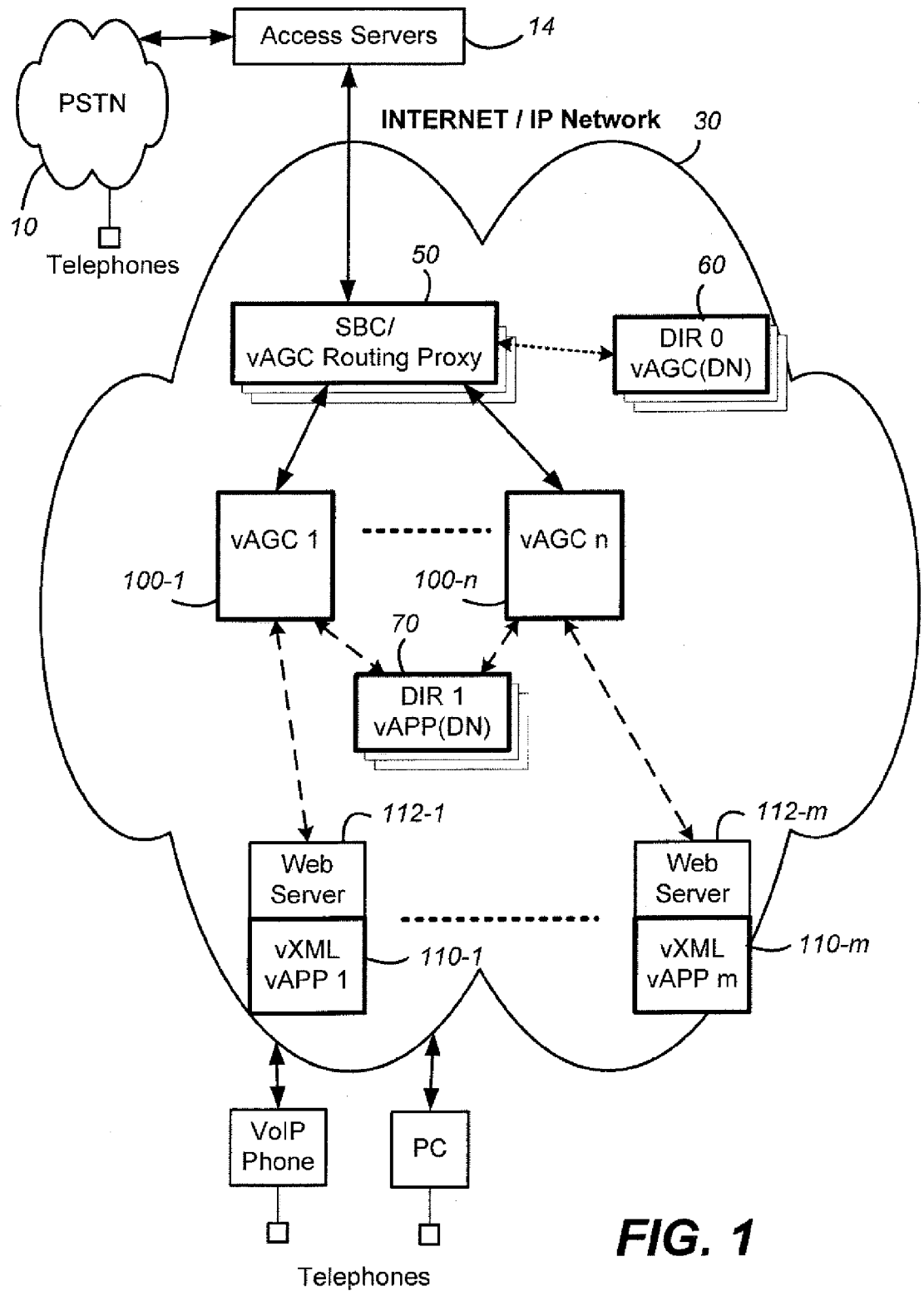
FIG. 1 illustrates a preferred network configuration including the PSTN and the Internet for practicing the invention.

FIG. 1 illustrates a preferred network configuration including the PSTN and the Internet for practicing the invention. The PSTN 10 is a network of telephones connectable by switched circuits and the Internet 30 is a network of IP devices and resources communicating by IP packets.

A plurality of voice applications scripted in vXML 110-1 to 110-$m$ is hosted by corresponding web servers 112-1 to 112-$m$ and is accessible on the Internet. These applications are coded in XML scripts that also contain custom telephony XML tags. The vXML scripts allow complete telephony applications to be coded.

A plurality of voice application gateway centers ("vAGC") 100-1, ..., 100-$n$ (also referred to as "voice centers") is deployed on the Internet. Each vAGC 100 essentially serves as a "browser" for one of the vXML voice applications and processes a received call by executing an appropriate vXML script.

Each Application Gateway Center (vAGC) 100 is a call-processing center on the Internet 30 for intercepting and processing calls to any one of a set of designated telephone call numbers. The calls may originate or terminate on any number of interconnected telecommunication networks including the Internet 30, the PSTN 10, and others (not shown) such as wireless networks.

One or more access servers 14 route calls between the PSTN and the Internet. The access servers are able to route a call to a destination vAGC on the Internet/IP network after a directory lookup. In the preferred embodiment, a group of SBC/vAGC routing proxy servers 50 such as SIP registrar servers are employed to perform the routing on the Internet/IP network. In the context of VoIP, a call is a session and a SBC (Session Border Controller) is responsible for exerting control over the signaling (SIP) and usually also the media streams (RTP) involved in setting up, conducting, and tearing down telephone calls or other interactive media communications. In that case, the access server relates the call to one of the SBC/vAGC routing proxy servers. As different LECs may set up access servers with varying amount of features and capabilities, it preferable for voice centers to rely on the group of SBC/vAGC routing proxy servers with guaranteed specification and capabilities to do the final routing.

Each vAGC 100 processes a call according to the telephony application (vAPP) associated with the called number. When a call is directed to the Internet, the access server 14 looks up the address of a destination vAGC in a directory, DIR0 60, and routes the call to the destination vAGC.

The directory DIR0 enables a list of vAGC to be looked up by dialed number. When a call to one of the designated dialed numbers is made from the PSTN, it is switched to the access server 12 and a lookup of the directory DIR0 allows the call to be routed to vAGC 100 for processing. Similarly, if the call originates from one of the terminal equipment (e.g., a PC 40 or a VOIP phone 42) on the Internet, a directory lookup of DIR0 provides the pointer for routing the call to one of the vAGCs.

Once the vAGC has received the call, it looks up another directory, DIR1 70 for the URL of the vXML application associated with the called or dialed number. Thus, the plurality of telephony applications vAPP 110-1, ..., 110-$m$, each associated with at least one designated call number, is accessible by the vAGC from the Internet. After the particular vXML is retrieved by the looked up URL, the vAGC then executes the vXML script to process the call.

The directory DIR1 provides the network address of the various applications. When a vAGC 100 receives a call, it uses the call number (or dialed number "DN") to look up DIR1 for the location/address (whether a URL or an IP address or some other location method) of the vAPP associated with the DN. The vAGC 100 then retrieves the vXML web application and executes the call according to the vXML scripts.

Figure 2:
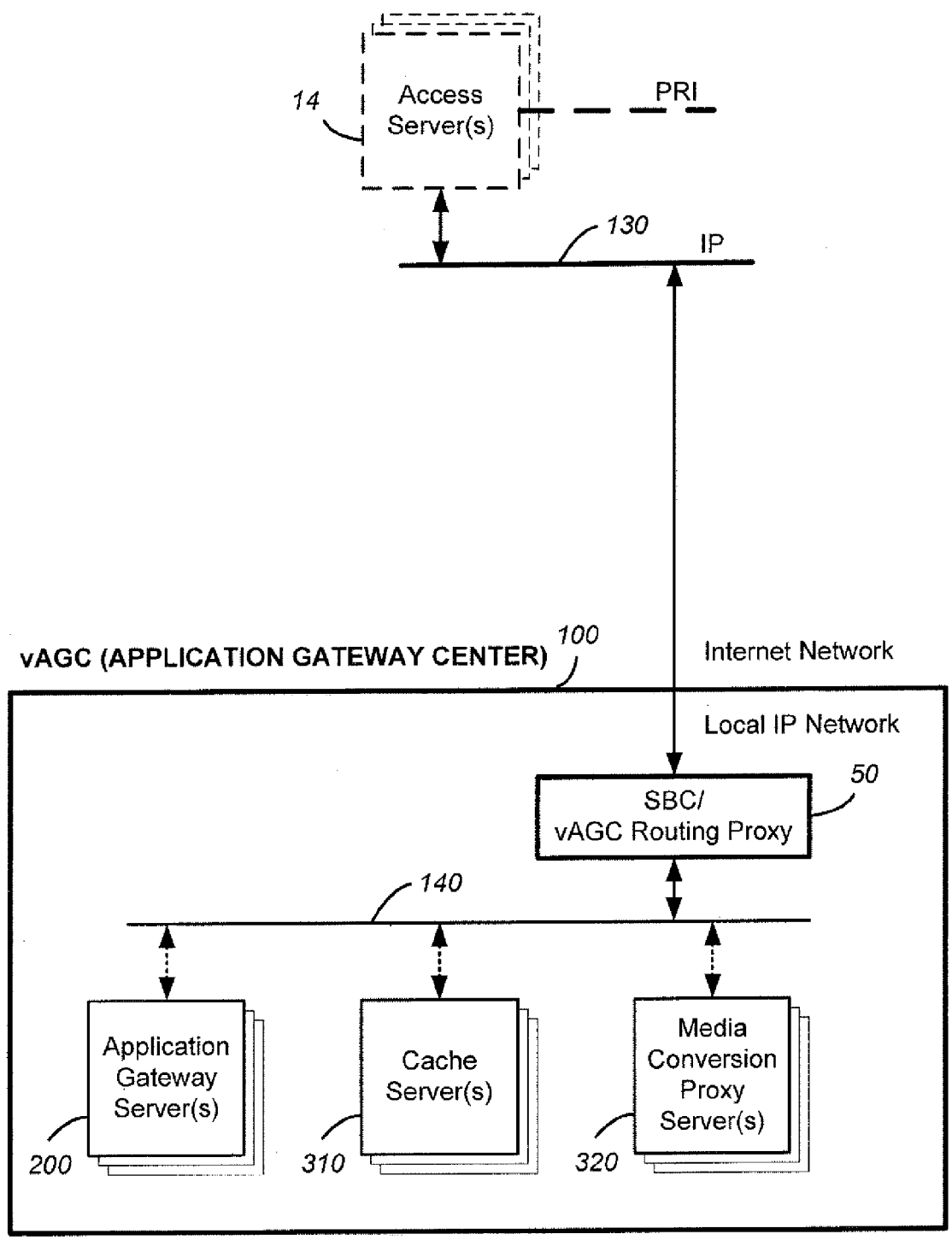
FIG. 2 is a block diagram illustrating the components of the Application Gateway Center.

FIG. 2 is a block diagram illustrating the components of the Application Gateway Center. The Application Gateway Center vAGC 100 may be considered to be a facility hosting a cluster of servers for the purpose of receiving calls and running the associated telephony applications, vAPPs, reliably and efficiently. Typically, the hosted facility is maintained by a hosted facility provider and hosts any number of IVRs for its subscribers.

In the preferred embodiment, the vAGC 100 is located in a private, local IP 140 network segment behind the SBC/vAGC routing proxy 50. On the other side of the SBC/vAGC routing proxy is the public IP network at large or the Internet network 130. The local IP network segment 140 allows direct communication between an application gateway server 200, a cache server 310 and a media conversion proxy server 320. The cache server 310 and the media conversion proxy server 320 may also connected directly to the Internet via the Internet network segment 130 (not shown explicitly). To increase performance and reliability, multiple servers of each type are installed in the vAGC 100.

The application gateway server 200 exchanges data with the Internet indirectly through the cache server 310 and possibly the media conversion proxy server 320. As will be described in more detail later, upon receiving a call, the AGS 200 retrieves the associated vAPP from a website and proceeds to execute the vXML scripts of the vAPP. During the course of executing the vXML scripts, associated media and/or files may also be retrieved from various sites as part of the vAPP suite.

In the preferred embodiment, in order to increase performance, the vXML scripts, media and files that are retrieved into the vAGC are cached by the cache server 310. They are requested by the AGS through the cache server 310. If a cached copy of the requested data exists in the cache server, it is delivered directly to the AGS. If not, the cache server retrieves the data, caches it and delivers the data to the AGS to fulfill the request.

In some embodiments, in order to simplify the design of the AGS and to improve the performance and scalability of it, the AGS is designed to handle only one native media format. For example, one suitable format for audio is G.711 or GSM. Media that come in different format are handed over to the media conversion proxy server 320, which coverts the media to the native format of the AGS 200.

A similar networked computer telephony system is disclosed in U.S. Pat. No. 6,922,411, the entire disclosure is incorporated herein by reference.

In operation, when a call is made to a dialed number (DN) registered as one of the numbers handled by the vAGC, it is routed to a vAGC such as vAGC 100 after a lookup from DIR0. The vAGC 100 initiates a new session for the call and looks up DIR1 for the net address of the telephony application vAPP 110 associated with the DN. The vAGC 100 retrieves vAPP 110 and proceeds to process the vXML scripts of vAPP 110.

For example, the vXML scripts may dictate that the new call is to be effectively routed back to the PSTN to a telephone 13 on another local exchange. In another example, the vXML scripts may dictate that the call is to be effectively routed to a VoIP phone 15 on the Internet. In practice, when connecting between two nodes, the vAGC creates separate sessions for the two nodes and then bridges or conferences them together. This general scheme allows conferencing between multiple parties. In yet another example, the vXML scripts allows the call to interact with other HTML applications or other back-end databases to perform on-line transactions.

Thus, the present system allows very powerful yet simple telephony applications to be built and deployed on the Internet. Many of these telephony or voice applications fall into the category of interactive voice response ("IVR") applications. The following are some examples of voice applications.

A "Follow me, find me" application sequentially calls a series of telephone numbers as specified by a user until one of the numbers answers and then connects the call. Otherwise, it does something else such as takes a message or sends e-mail or sends the call to a call center, etc.

In another example, a Telephonic Polling application looks up from a database the telephone numbers of a population to be polled. It then calls the numbers in parallel, limited only by the maximum number of concurrent sessions supported, and plays a series of interactive voice prompts/messages in response to the called party's responses and records the result in a database, etc.

In another example, a Help Desk application plays a series of interactive voice prompts/messages in response to the called party's responses and possibly connects the call to a live agent as one option, etc. In yet another example, a Stock or Bank Transactions application plays a series of interactive voice prompts/messages in response to the called party's responses and conducts appropriate transactions with a back-end database or web application, etc.

Many companies have a need to notify customers by telephone. One such example is for an airline to notify passengers of changed flight schedules. An IVR application can be used to automatically dial the passengers listed in a database and play a message to notify the changed flight schedule.

As described earlier, many of the transactions and phone conversations may need to be recorded and archived at the Application Gateway Center (vAGC) 100. Solutions will be described in the following to keeping the records and archives belonging to individual subscribers confidential even from a third-party hosting the vAGC.

Application Gateway Server

Figure 3:
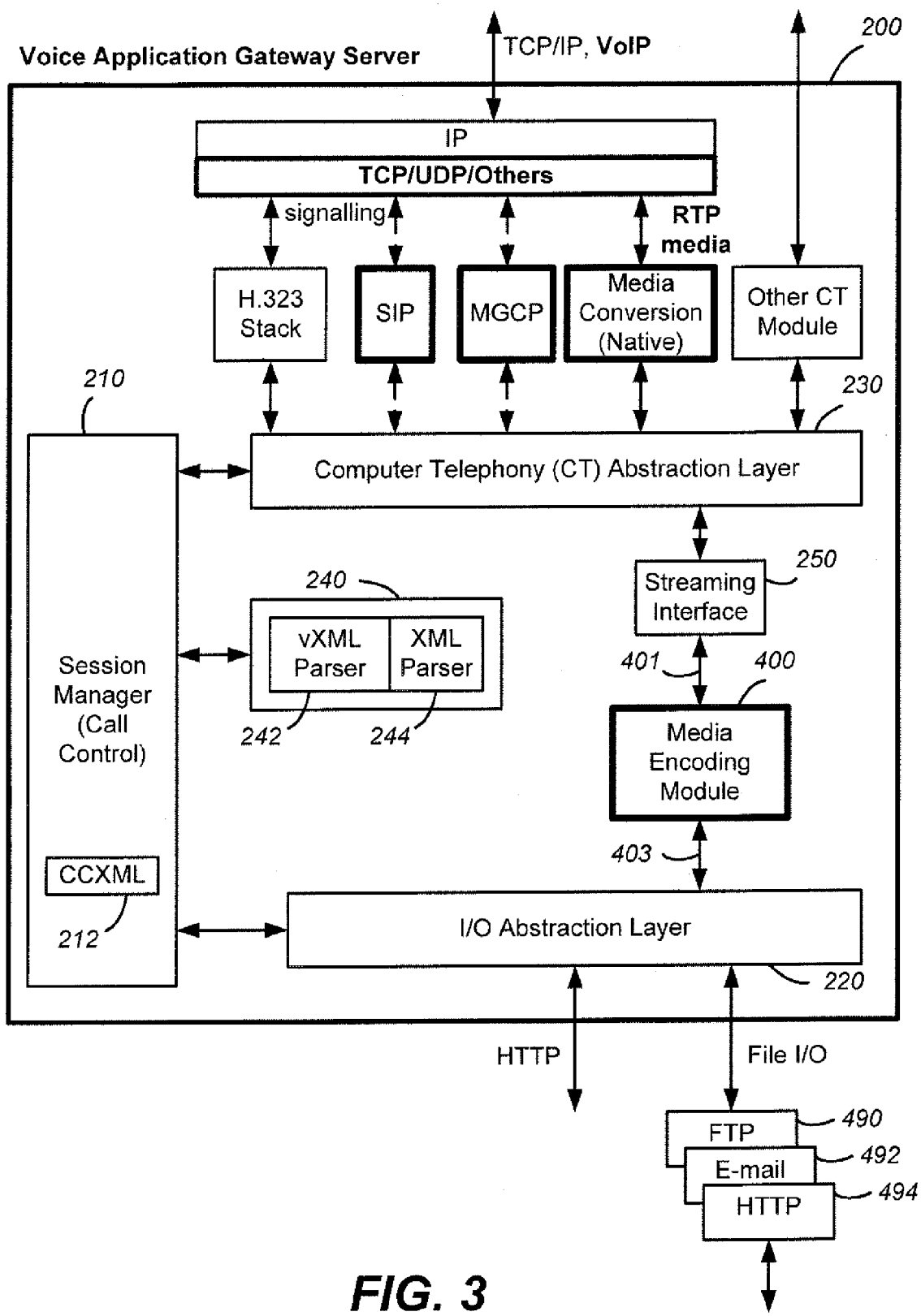
FIG. 3 is a detailed block diagram of the Application Gateway Server, which is the main component of the Application Gateway Center.

FIG. 3 is a detailed block diagram of the Application Gateway Server, which is the main component of the Application Gateway Center. The Application Gateway Server (AGS) 200 is responsible for accepting incoming calls, retrieving the vAPP associated with the dialed number and executing the vXML scripts of the vAPP. Each incoming call is treated as a separate session and the AGS is responsible for processing all user events and system actions that occur in multiple simultaneous sessions. The AGS is also responsible for all call routing in all sessions.

In the preferred embodiment, the AGS 200 is a set software modules running on a Windows NT or UNIX server. For example, the AGS is implemented as a Windows NT machine on a card, and multiple cards are installed on a caged backplane to form a high scalable system.

The AGS 200 comprises four main software modules, a session manager 210, an I/O abstraction layer 220, a computer telephony (CT) abstraction layer 230, and a telephony scripting language parser 240. The telephony scripting language parser 240 further comprises a telephony XML or vXML parser 242 and a generic XML parser 244. In addition, a streaming interface 250 provides a direct streaming path for media data between the I/O abstraction layer 220 and the CT abstraction layer. Each of these modules is designed to be a separate DLL (Dynamically Linked Library) and perform a specific task. In the preferred embodiment, the AGS is a console only application with no user interface for any of these modules.

The session manager 210 is the centerpiece of the AGS 200. It is responsible for creating new sessions, deleting terminated sessions, routing all actions and events to the appropriate modules and maintaining modularity between each session. It responds to I/O and vXML goto requests, and other additional events. One important function of the session manager 210 is to perform call control operations. For example, in the context of VoIP, it is implemented as a SIP controller driven by CCXML (Call Control XML) scripts 212. In one embodiment, it employs commercially available software libraries containing thread and string classes from PWLib, a product of Equivalence Pty Ltd, Erina, New South Wales, Australia.

The session manager interfaces to the external of the AGS via the I/O abstraction layer 220 and the CT abstraction layer 230. It accesses the I/O and CT layers as a set of classes and member functions that are individual DLLs. The Session Manager 210 runs as a single-threaded processor of actions and event.

FIG. 3 also illustrates the manner in which the modules of the AGS must communicate with each other. The session manager communicates to both the I/O abstraction layer and the CT abstraction layer through traditional DLL entry points with C/C++ parameter passing. The I/O abstraction layer and the CT abstraction layer communicate through a streaming interface. The session manager and the telephony scripting language parser communicate through DLL entry points using microXML. The session manager 210 behaves like a virtual machine with its own set of "OpCodes".

A session begins with the reception of an asynchronous event from the CT abstraction module 230 signaling an incoming call. The Session Manager then creates a session for this call by accessing a database (e.g. DIR1 of FIG. 1) keyed on the session's DNS and ANI information, which returns an initial vXML script. The telephony scripting language parser 240 is a separate DLL invoked through short microXML event scripts. It returns a microXML action script. A cycle of actions and events begins with the transmission of this script to the telephony scripting language parser 240 for processing. The telephony scripting language parser 240 responds to this event by returning a simple vXML script of its own containing I/O and CT action requests collected from the parsing of the script. The Session Manager now processes these action requests and then returns to parsing until the end of the session.

Each session is assigned a unique session identification, SID (session ID). For example, in the Microsoft Win32 platform, the SID is conveniently implemented by the creation of 128 bit globally unique Ids (GUIDs).

In the preferred embodiment, the session manager 210 is accessed or invoked via a number of interface points of its DLL.

The I/O abstraction layer 220 performs all input and output operations for the AGS 200. Essentially, it renders transparent to the internal of the AGS the variety of I/O formats and protocols that might be encounter externally. To the session manager 210, most HTTP, FTP, File, and memory-mapped I/O requests are reduced to four commands: open, close, read, and write. This allows access to a stream from any of these sources with the same procedure calls once the stream is open. In one embodiment, it incorporates available commercial software libraries, such as WinInet from Microsoft Corporation, Seattle, Wash., U.S.A and PWLib from Equivalence Pty Ltd. WinInet is a windows-specific DLL that allows the I/O abstraction layer to communicate to outside sources using HTTP and FTP. PWLib also used by the session manager 210 contains strings and threads classes.

In the preferred embodiment, the I/O abstraction layer 220 is accessed or invoked via a number of interface points of its DLL. A single thread per active stream is created when accessed by the session manager 210. If the stream is FTP or HTTP-based, then the user will need to provide the appropriate login data, submission method, and CGI variables. Next, the user calls the Open method and then uses the Read and Write methods to operate upon the stream until closing it with the Close method. At this point, this instance of the stream is available for use on another stream source or it can be deleted.

The computer telephony (CT) abstraction layer 230 is a thin abstraction layer that makes it possible for the AGS 200 to communicate with several computer telephony devices and/or protocols. In one direction, the CT abstraction layer receives requests for computer telephony actions from the session manager 210 and translates those requests to a CT module. In the other direction the CT abstraction layer receives user events directed to that CT module and relates them back to the session manager. In the preferred embodiment, the CT modules include a H.232 stack for handling VoIP signals, a SIP (Session Interface Protocol), a MGCP (Media Gateway Control Protocol) as well as other CT modules such as Dialogic CT modules. Since several CT modules can be placed below the CT abstraction layer and the CT abstraction will talk to all of the CT modules, the modular design allows the AGS to communicate with a new computer telephony device or protocol simply with the addition of a new CT module.

The CT abstraction layer 230 will preferably make use of PWLib's platform-independent thread class. The CT Abstraction layer is instantiated by the Session Manager 210. It then seeks out a vXML configuration file that contains information on the number and type of telephony boards in its system. The member functions represent generic functionality that should be supportable across a wide variety of telephony hardware. The motivation for this abstraction layer is to make the AGS 200 both platform and protocol independent.

In the preferred embodiment, the Session Manager 210, XML Parser 240, and CT Abstraction layer 230 cooperate via the following protocol. First, the telephony scripting language parser 240 locates a vXML element which requires a telephony task. Next, the telephony scripting language parser sends this task to the Session Manager in a microXML action string. The Session Manager then parses the microXML action string and determines the appropriate call to the CT abstraction layer along with its associated parameters. The Session Manager now calls the CT abstraction layer asynchronously and the CT abstraction layer returns an event signaling the completion of the CT task and the Session Manager resumes parsing.

In the preferred embodiment, the CT abstraction layer 230 is accessed or invoked via a number of interface points of its DLL.

The streaming interface 250 provides a direct streaming transfer between the I/O abstraction layer 220 and the CT abstraction layer 230 when media data, such as audio or other multimedia is involved. For example, the streaming interface facilitates the AGS to play audio from URL's and to record audio to URL's in a streaming manner. In the preferred embodiment, the interface is generic and passes the burden of buffer management to the CT module in use. This allows specific CT modules to buffer information as appropriate for the corresponding telephony hardware or protocol. The streaming interface is implemented through designated interface points in the I/O abstraction layer.

The telephony scripting language parser 240 is responsible for parsing the vXML scripts handed to it by the session manger 210. It in turn informs the session manager of the described actions coded in the vXML scripts. The telephony scripting language parser is modular and can accommodate additional parsers such as that for voiceXML and parsers for other telephony scripting language that may arise. In the present preferred embodiment, it comprises the vXML parser 242 and the generic XML parser 244.

The generic XML parser 244 parses the vXML scripts, which are essentially XML scripts with embedded custom telephony tags, and puts them in a format that the vXML parser 242 can expediently act on. In the preferred embodiment, the generic XML parser 244 conveniently employs CueXML components available from CueSoft, Inc, Brighton, Colo., U.S.A. These components enable parsing of vXML documents into an object model, DOM (Document Object Model) listing the parsed objects in a hierarchical tree structure. This allows the vXML parser 242, which in the preferred embodiment is a DLL written in Delphi 5.0, to "walk" through the tree of objects and interpret them into microXML codes that can be understood by the session manager 210.

The vXML parser 242 behaves as follows: when called it will examine the incoming microXML and determine if there is a buffer of new vXML to parse, if such a buffer exists then the parser uses the generic XML parser 244 to construct a new object model for this buffer, the session object model is set to that model and the session state is cleared. The vXML parser 242 begins parsing from the session state in the session object model (an empty state implies the beginning of a document). As the parse traverses the document model the state is updated and events are generated. If these events are internal to the processor they are handled (i.e. assigns update the session variables, blocks may cause looping to occur), if the events are not internal then they are buffered for return to the session manager. When an event needs to be reported to the session manager the event buffer is processed so that variables are replaced with their values, wildcards are properly expanded, etc. This negates the need for any other module to maintain information about session variables.

The vXML parser 242 is required to maintain state per session so that each invocation of the vXML parser will continue where the previous invocation within the same session ended. The maintenance of state includes preserving the DOM for the current instance of vXML, the node in the DOM that the parser is currently examining, and any variables that are associated with the session.

In the preferred embodiment, the vXML parser 242 is accessed or invoked via a number of interface points of its DLL.

A similar Application Gateway Server has been disclosed in U.S. Pat. No. 6,922,411, the entire disclosure is incorporated herein by reference.

Compression and Encryption of Media

FIG. 3 also illustrates a Media Encoding Module 400 between the streaming interface 250 and the I/O Abstraction Layer 220. The media encoding module 400 is coupled to the streaming interface 250 via a bus 401 and to the I/O Abstraction Layer 220 via a bus 403. Depending on the application as specified by the XML scripts, RTP media could be transported between Layer 230 and Layer 220 either unaltered via the streaming interface 250 or further encoded via the Media Encoding Module 400.

For example, when a caller makes a call to the IVR of a subscriber, phone conversation comprising of one or more media streams may be generated. The phone conversation may be processed by the media encoding module 400 and recorded as a media file and output via a File I/O port to the subscriber or even the caller via an output service such as FTP 490, e-mail 492 and HTTP 494.

Figure 4:
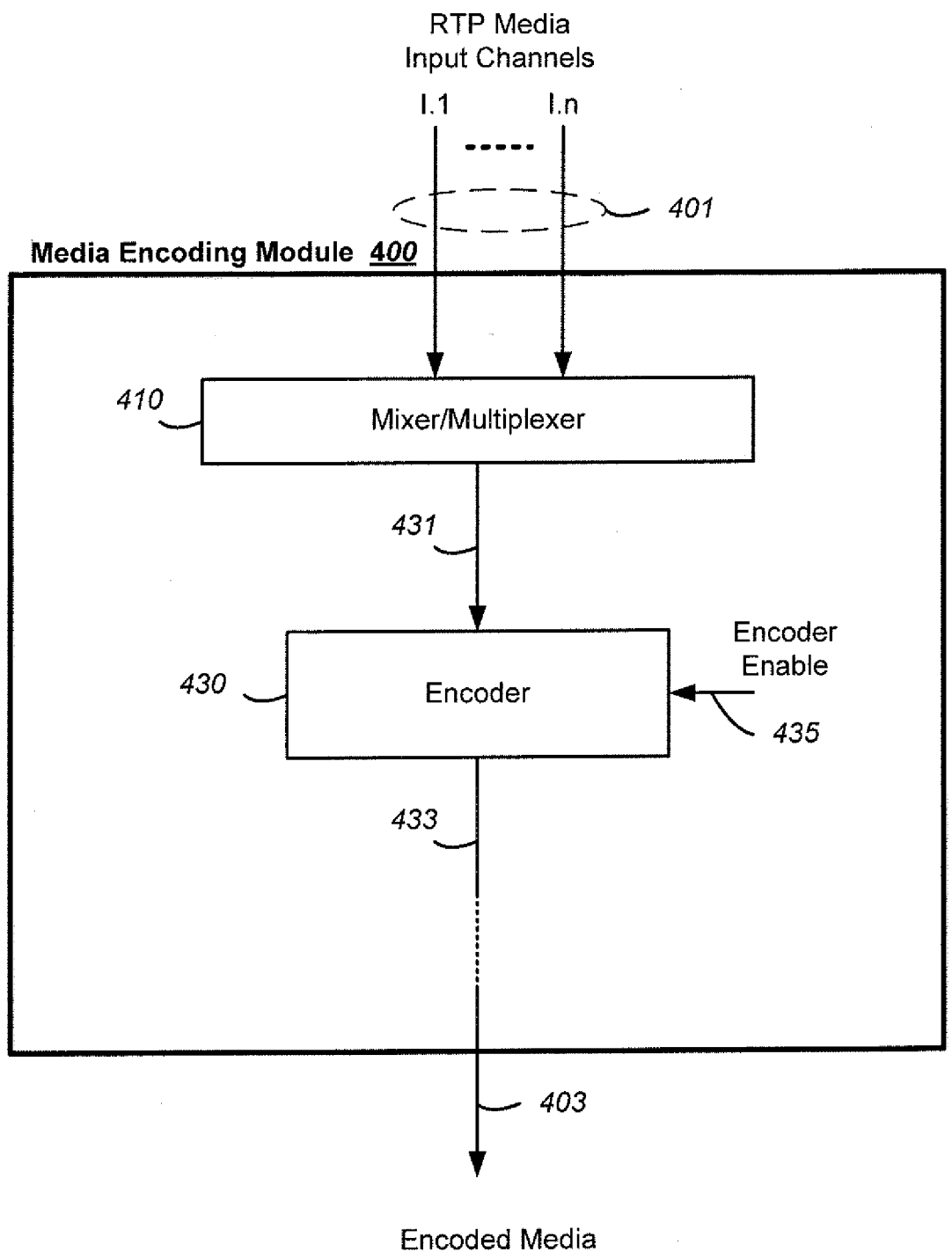
FIG. 4 is a functional block of the media encoding module shown in FIG. 3, according to one embodiment of the invention.

FIG. 4 is a functional block of the media encoding module shown in FIG. 3, according to one embodiment of the invention. The media encoding module 400 comprises a mixer/multiplexer 410 and an encoder 430. The mixer/multiplexer 410 mixes RTP media inputs from selected channels among input channels I.1 to I.n. For example, for a call between two endpoints, the IVR typically creates two real-time media streams (most commonly utilizing RTP protocol), one in each direction. The mixer/multiplexer 410 combines the two media streams to form a recording of the conversation. The mixed, conversation stream is fed to the encoder 430 via a line 431.

The encoder 430 takes in the stream from line 431 and encodes the stream into an encoded stream to be output to line 433 which eventually finds its way to the output line 403 of the media encoding module 400. The encoder is described in more detailed in connection with FIG. 5 and FIG. 6. FIG. 4 illustrates schematically that it can be enabled or disabled by a control such as Encoder Enable control 435. When the encoder is implemented in hardware, the encoder enable control 435 is a control signal that when asserted will enable the encoder. Otherwise, the encoder will serve as a pass-through for the stream.

Figures 5, 6:
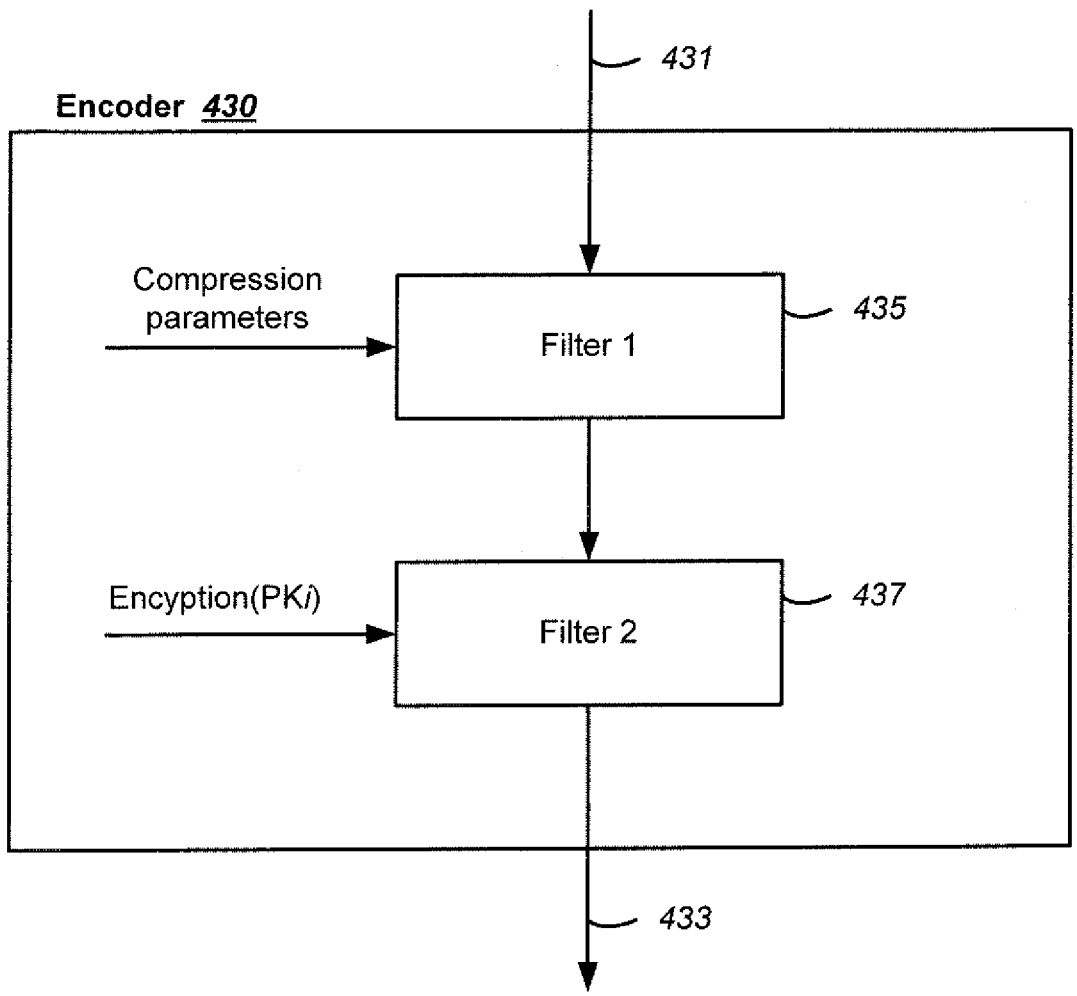
FIG. 5 illustrates a preferred implementation of the encoder shown in FIG. 4.
FIG. 6 illustrates schematically the public key information contained in an entry in the subscriber directory.

FIG. 5 illustrates a preferred implementation of the encoder shown in FIG. 4. The encoder 430 is implemented in software as apart of a filtergraph series of one or more filters to process/alter the media stream. In the example shown in FIG. 5, the encoder comprises two filters. Filters are software objects that provide a set of standardized interfaces. Thus a filtergraph is a collection of filters arranged together in a predefined configuration.

A first filter 1 435 serves to compress the input stream from line 431. The filter 1 is under the IVR program control and responsive to a set of compression parameters that specify how the compression is to be performed. In the trivial case, no compression is done to the stream and the stream is passed through unmodified. When two filters connect their pins together the pins agree a media type that defines the data to be exchanged, and obtain interfaces on each other which they will use to exchange data.

A second filter 2 437 serves to encrypt the input stream from the first filter 1 435. Again the second filter 2 is responsive to a set of encryption parameters that specify how the encryption is to be performed. For example, one encryption parameter is a public key of the subscriber. In the trivial case, no encryption is done to the stream and the stream is passed through unmodified. The stream from the filter 2 is output to the line 433 which then becomes the output of the encoder 430.

According to one aspect of the invention, the encryption is a public-key encryption using the public key of the subscriber associated with the call number to an IVR. For a given telephone number used to call an IVR associated with a subscriber, a public-key of the subscriber is used to encrypt the media stream. For example, if a policy holder calls an insurance company's number the policy holder will interact with the IVR which causes the conversation to be encrypted. The conversation recorded as encrypted files with the public key of the insurance company who is the subscriber to the hosted facility. In this way, only the insurance company who also holds the private key pair can decrypt the encrypted files. To ensure that the third-party hosting service does not have access to the conversation or the media stream, the media stream is encrypted in real-time such that at any time no tangible portion of the conversation can be accessed unencrypted.

The public-key encryption is based on the RSA (Rivest, Shamir, and Adleman) Public-Key system. This relies on the principle of computationally complex algorithms to achieve encryption. The scheme has a user pick two very large prime numbers, preferable a few hundred digits each, to generate a pair of dissimilar encryption (public) and decryption (private) keys. Encryption is performed as exponentiation under a modulo arithmetic control by the encryption key. The encryption key can be made public for anyone to encrypt messages intended for the user, but is useless in deriving the decryption key. Thus, the encrypted messages can only be read by the user in possession of the decryption key. The security of the system is based on the use of very large prime numbers that are not easy to obtain. The system can only be defeated if a quick way to factorize the product of two large prime number is discovered.

The two filters 435, 437 allow compression followed by encryption to be applied to the media stream passing through. The filters are under the program control of the IVR and can be enabled or disabled or operating with different effects depending on the parameters.

For example, if the subscriber wishes to performing data mining of the recordings later, the recordings should be made with either lossless compression or a minimum of compression so that they are more amenable to voice recognition engines.

In another example, if the recordings are to maintain archive for occasional verification and audit, the stream is preferably compressed to make encryption faster and storage smaller.

In yet another example, the encryption is turned on by default for a given IVR.

In yet another example the encryption is turned on only when certain programmed branch of the IVR is reached or in response to a caller's input action or content.

FIG. 6 illustrates schematically the public key information contained in an entry in the subscriber directory. The voice application as driven by the telephony XML scripts has access to the public key either by hard coding directly in the XML scripts or by looking up with the dialed number DN in a subscriber directory for the associated public key. Thus, a given DN points to a subscriber i which has a public key PKi.

Figure 7:
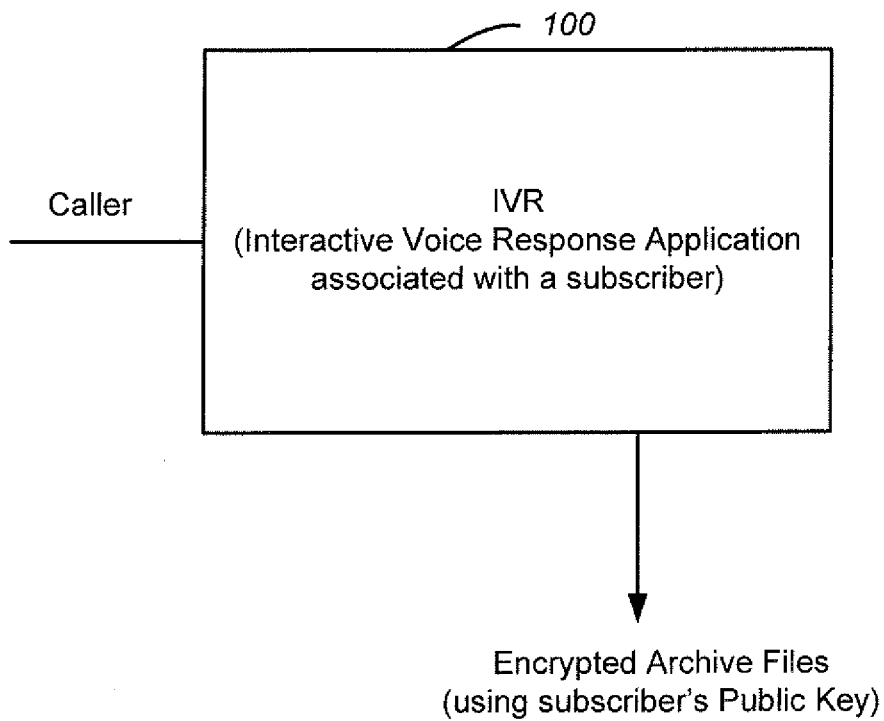
FIG. 7 illustrates a general scheme of the invention in which media stream generated in an IVR is encrypted with a public key of the subscriber deploying the IVR.

FIG. 7 illustrates a general scheme of the invention in which media stream generated in an IVR is encrypted with a public key of the subscriber deploying the IVR. As described earlier, there is often a need by the subscriber to record phone transactions of a caller. The resulting media stream is encrypted with the public key in real-time so that the stream is kept confidential even from a third-party hosting facility provider.

Figure 8:
FIG. 8 illustrates a general scheme in which a caller's phone transactions after being archived as an encrypted file are decrypted by the subscriber's private key.

FIG. 8 illustrates a general scheme in which a caller's phone transactions after being archived as an encrypted file are decrypted by the subscriber's private key.

The embodiment shown in FIG. 4 combines all media channels of a conversation to form a combined conversation stream. In that arrangement, only one combined stream needs be processed by the encoder 430. In other applications, the subscriber may desire to keep the various media channels separate. For example, in performing data mining, sometimes only the caller's content is of interest and concentrating on analyzing the caller's media stream will cut down on unnecessary work by a voice recognition engine.

Figure 9:
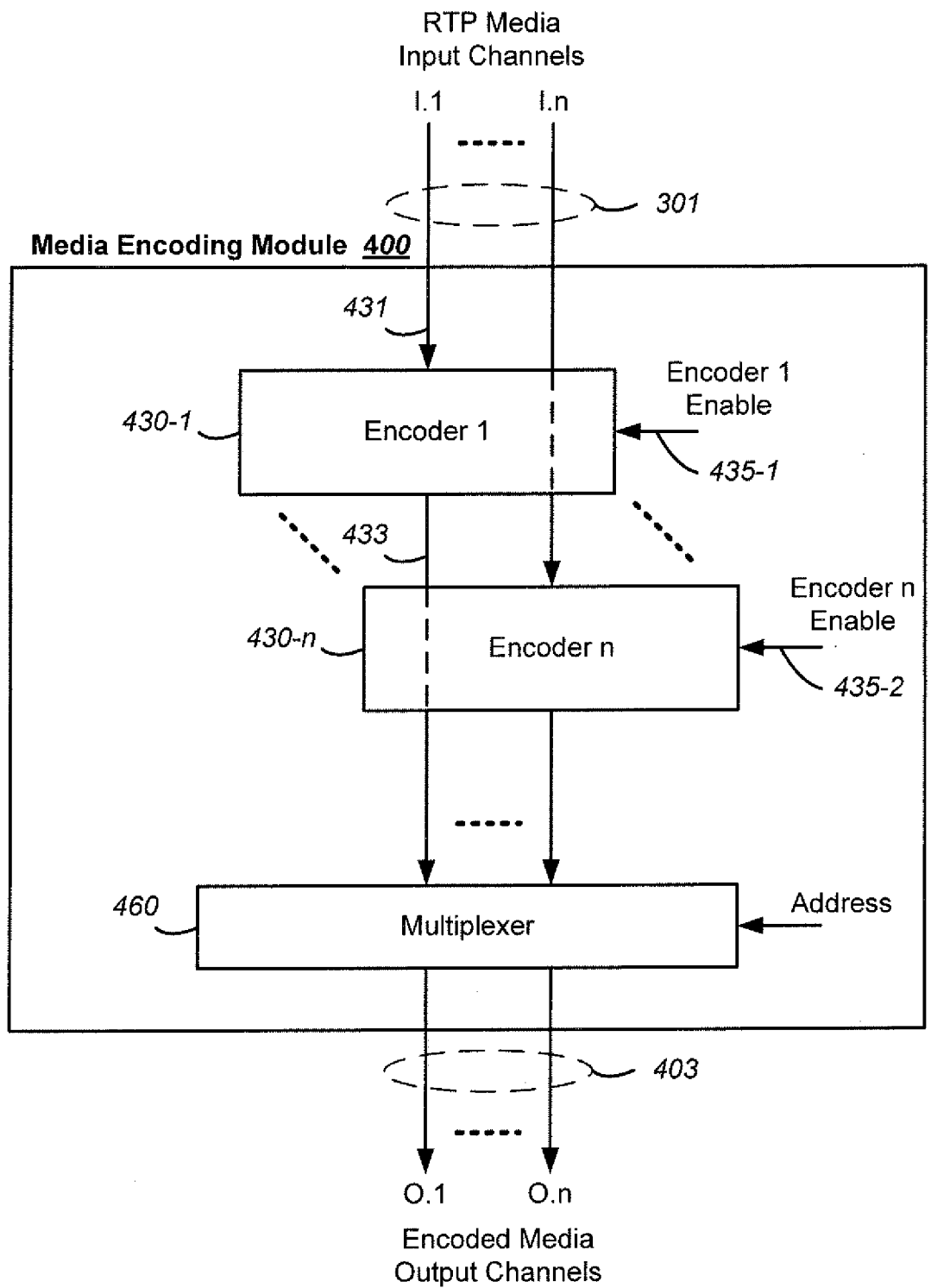
FIG. 9 is a functional block of the media encoding module shown in FIG. 3, according to another embodiment of the invention.

FIG. 9 is a functional block of the media encoding module shown in FIG. 3, according to another embodiment of the invention. In this embodiment the media encoding is performed independently on individual media channels. Thus, media streams from individual channels are respectively directed to independent encoders such as input channel I.1 to encoder 1 430-1, . . . , input channel I.n to encoder n 430-n.

After the media individual channels have been processed by the associated encoders, the processed media streams are sent to the RTP media output channels 0.1 to 0.n via a multiplexer 460. The switching by the multiplexer 460 is responsive to an address under program control. In this way, media from individual channels are independently compressed and/ or encrypted.

As in the encoder shown in FIG. 4, when each encoder is implemented in hardware, the encoder enable controls 435-1, . . . , 435-n are control signals that when respectively asserted will enable the respective encoders 430-1, . . . , 430-n. Otherwise, the encoder in question will serve as a pass-through for the stream.

Figure 10:
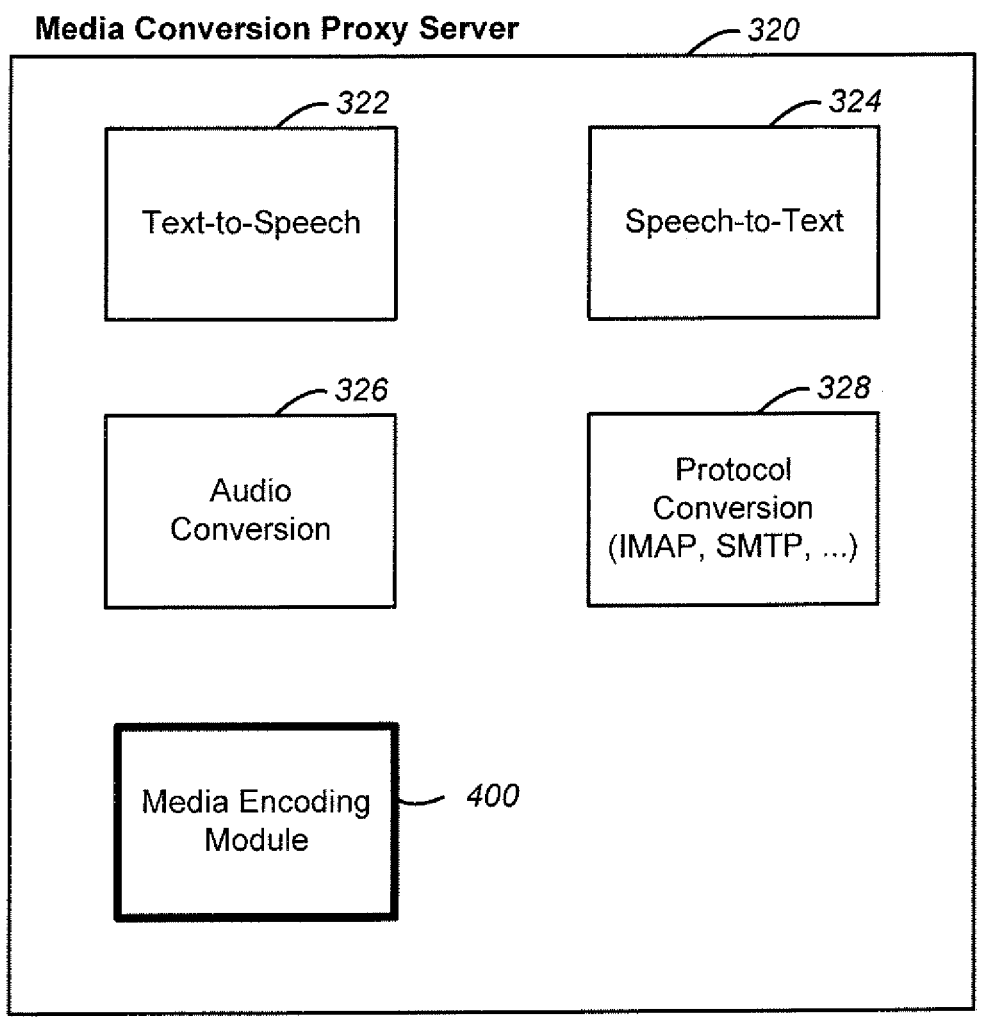
FIG. 10 illustrates schematic another embodiment of co-locating the media encoding module with the media conversion proxy server shown in FIG. 2.

FIG. 10 illustrates schematic another embodiment of co-locating the media encoding module with the media conversion proxy server shown in FIG. 2. The media conversion proxy server 300 typically comprises a text-to-speech module 322, a speech-to-text module 324, an audio conversion module 326 and a protocol conversion module 328. The modular design allows for other "plug-ins" as the need arises. The text-to-speech module 322 is used for converting text to synthesized speech. For example, this is useful for reading back e-mail messages. The speech-to-text module 324 is used for converting speech to text. This is useful in speech recognition applications involving responding to a user's voice response. The audio conversion module 326 converts between a supported set of audio formats, such as G.711, G.723, CD audio, MP3, etc. The protocol conversion module 328 allows conversions between protocols such as IMAP (Internet Message Access Protocol) and SMTP (Simple Mail Transfer Protocol).

In this embodiment, instead of providing the media encoding function at the application gateway server 200 (see FIG. 3), it is being provided from the media conversion proxy server 320. Thus, the media encoding module 400 is being provided as one module of the media conversion proxy server. In this way, the application gateway server 200 need not be burdened with varying amount of media processing, and dedicated hardware designed to handle media processing can be configured at the media conversion proxy server.

Figure 11:
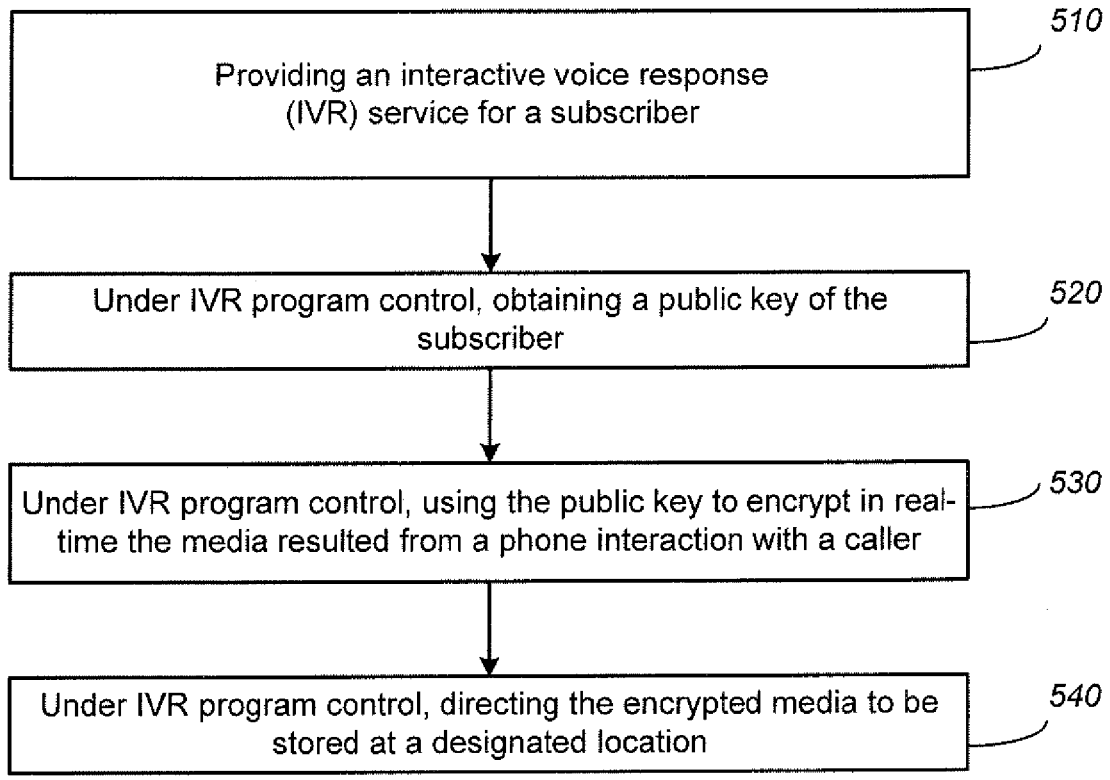
FIG. 11 is a flow diagram illustrating schematically a general embodiment of the invention.

FIG. 11 is a flow diagram illustrating schematically a general embodiment of the invention.

STEP 510: Providing an interactive voice response (IVR) service for a subscriber.

STEP 520: Under IVR program control, obtaining a public key of the subscriber.

STEP 530: Under IVR program control, using the public key to encrypt in real-time the media resulted from a phone interaction with a caller.

STEP 540: Under IVR program control, directing the encrypted media to be stored at a designated location.

Figure 12:
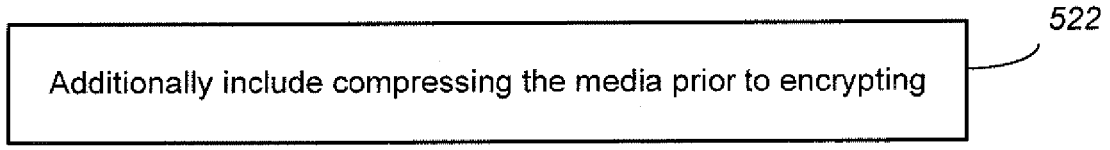
FIG. 12 is a flow diagram illustrating schematically a further feature of the invention.

FIG. 12 is a flow diagram illustrating schematically a further feature of the invention.

STEP 522: Additionally include compressing the media prior to encrypting.

The preferred embodiments have been described in the context of a voice conversation stream. However, it is to be understood that other type of media such as video and other types of audio are also contemplated. The preferred embodiments have also been described in the context of VOIP in the IP network. However, the invention is equally applicable to transport schemes other that in packet mode such as time-division multiplexing ("TDM") common in the PSTN network.

While the embodiments of this invention that have been described are the preferred implementations, those skilled in the art will understand that variations thereof may also be possible.

It is claimed:

1. A method of hosting an interactive voice response service for a subscriber, comprising:
   processing a call made to a call number of the subscriber using the interactive voice response service for the subscriber;
   providing an application script associated with the subscriber for driving the interactive voice response service;
   providing as part of the interactive voice response service a media archiving service for archiving one or more media stream of the call;
   the media archiving service further comprising:
   designating at least one event in the interactive voice response service to trigger the media archiving service;
   in the event the media archiving service is triggered based on the at least one event, obtaining a public key of a public key encryption of the subscriber from the application script and encrypting the one or more media stream of the call in real-time using the public encryption key of the subscriber so that at any time no tangible portion of each of the one or more media stream is stored unencrypted, thereby keeping the media of the call private even from a provider of the hosting service;
   transmitting the encrypted media to a designation; and
   having the subscriber to use a private key of the public key encryption of the subscriber to decrypt the encrypted media.

2. The method as in claim 1, wherein
the one or more media stream comprises more than one media streams; and
said media archiving service further includes:
mixing the more than one media streams to form a combined media stream; and
wherein said encrypting is applied to the combined media stream.

3. The method as in claim 1, wherein:
said encrypting is enabled or disabled under program control of the interactive voice response service.

4. The method as in claim 1, wherein:
said encrypting is implemented by a filter object accessible through a set of interfaces.

5. The method as in claim 1, wherein:
said encrypting is performed in response to a set of encryption parameters.

6. The method as in claim 1, further comprising:
compressing each of the one or more media stream; and
wherein said encrypting is applied to the one or more media stream after it has been compressed.

7. The method as in claim 6, wherein:
said compressing is enabled or disabled under program control of the interactive voice response service.

8. The method as in claim 6, wherein:
said compressing is implemented by a filter object accessible through a set of interfaces.

9. The method as in claim 6, wherein:
said compressing is performed in response to a set of compression parameters.

10. The method as in claim 1, wherein
the one or more media stream comprises more than one media streams; and
said media archiving service further includes:
mixing the more than one media streams to form a combined media stream;
compressing the combined media stream into a compressed combined media stream; and
wherein said encrypting is applied to the combined media stream.

11. The method as in claim 10, wherein:
said compressing is implemented by a filter object accessible through a set of interfaces.

12. The method as in claim 10, wherein:
said compressing is performed in response to set of compression parameters.

13. An interactive voice response service for a subscriber, comprising:
a machine for executing an interactive voice response application; said interactive voice response application further comprising:
a call processing module to process a call made to a call number of the subscriber;
an application script associated with the subscriber for driving the interactive voice response service;
a media archiving service module being triggered by at least one event in the interactive voice response service for archiving one or more media stream of the call, said media archiving service module further includes a public key encryption module for obtaining a public key of a public key encryption of the subscriber from the application script and for encrypting the one or more media stream of the call in real-time using the public encryption key of the subscriber so that at any time no tangible portion of each of the one or more media stream is stored unencrypted, thereby keeping the media of the call private even from a provider of the hosting service; and
an output module for transmitting the encrypted media to a designation whereby enabling the subscriber to use a private key of the public key encryption of the subscriber to decrypt the encrypted media.

14. The interactive voice response service as in claim 13, wherein:
the one or more media stream comprises more than one media streams;
said media archiving service module further includes a mixer for mixing the more than one media streams to form a combined media stream; and
wherein said public key encryption module is applied to the combined media stream.

15. The interactive voice response service as in claim 13, wherein:
said public key encryption module is enabled or disabled under program control of the interactive voice response service.

16. The interactive voice response service as in claim 13, wherein:
said public key encryption module is implemented by a filter object accessible through a set of interfaces.

17. The interactive voice response service as in claim 13, wherein:
said public key encryption module is in response to a set of encryption parameters.

18. The interactive voice response service as in claim 13, further comprising:
a compression module for compressing each of the one or more media stream; and
wherein said public key encryption module is applied to the one or more media stream after it has been compressed.

19. The interactive voice response service as in claim 18, wherein:
said compression module is enabled or disabled under program control of the interactive voice response service.

20. The interactive voice response service as in claim 18, wherein:
said compression module is implemented by a filter object accessible through a set of interfaces.

21. The interactive voice response service as in claim 18, wherein:
said compression module is performed in response to a set of compression parameters.

22. The interactive voice response service as in claim 13, wherein
the one or more media stream comprises more than one media streams; and
said media archiving service further includes:
a mixer for mixing the more than one media streams to form a combined media stream;
a compression module for compressing the combined media stream into a compressed combined media stream; and
wherein said public key encryption module is applied to the combined media stream.

23. The interactive voice response service as in claim 22, wherein:
said compression module is implemented by a filter object accessible through a set of interfaces.

24. The interactive voice response service as in claim 22, wherein:
said compression module is performed in response to a set of compression parameters.

* * * * *